UNITED STATES PATENT OFFICE.

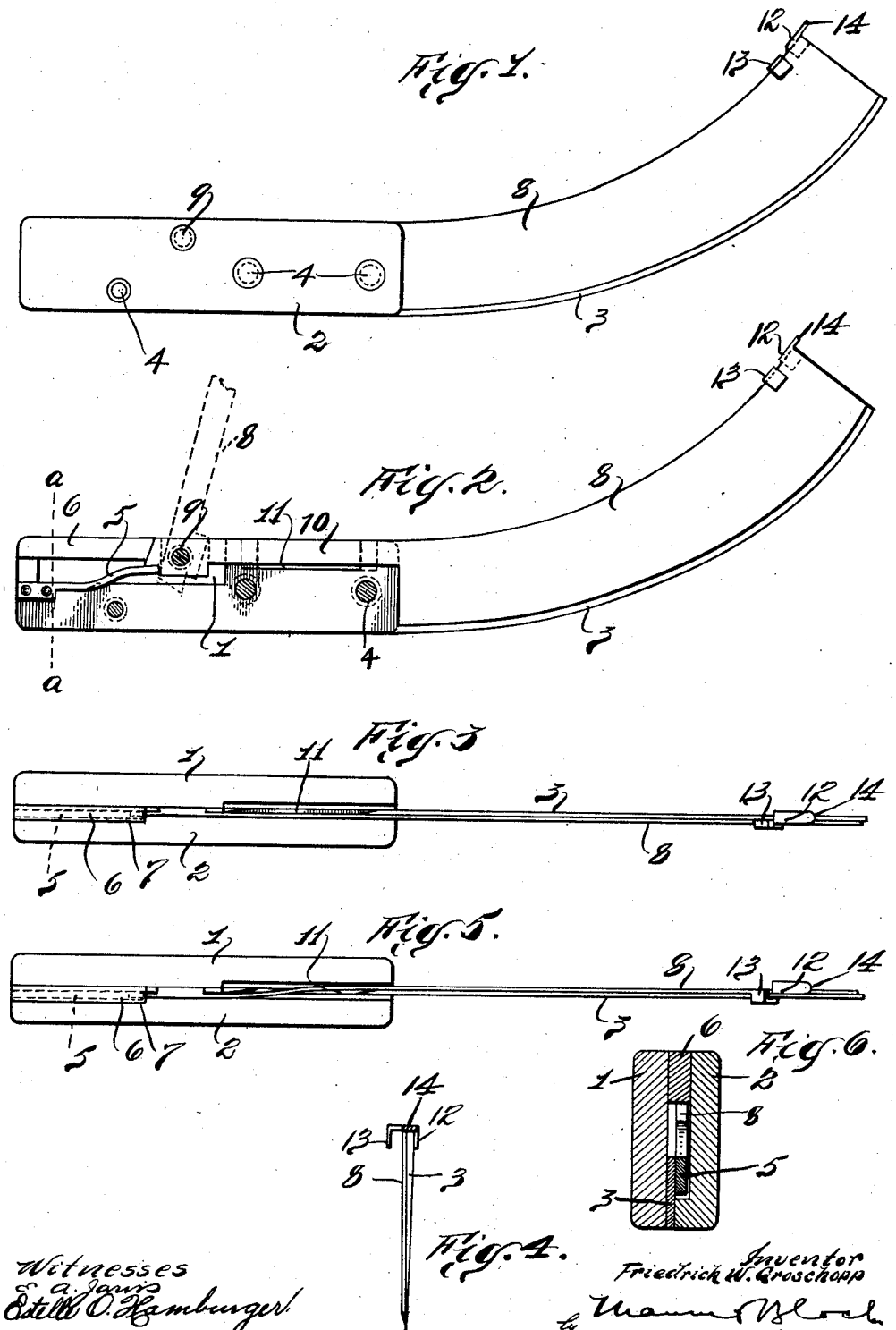

FRIEDRICH W. GROSCHOPP, OF NEW YORK, N. Y., ASSIGNOR TO KAMPFE BROS., OF NEW YORK, N. Y., A CORPORATION OF NEW YORK.

SAFETY SKINNING-KNIFE.

1,062,906.  Specification of Letters Patent.  Patented May 27, 1913.

Application filed May 25, 1912. Serial No. 699,635.

*To all whom it may concern:*

Be it known that I, FRIEDRICH W. GROSCHOPP, a subject of the Emperor of Germany, residing in the borough of Brooklyn, county of Kings, city and State of New York, have invented certain new and useful Improvements in Safety Skinning-Knives, of which the following is a full, clear, and exact description.

This invention relates to an improvement in skinning knives, or that class of knives used by butchers to cleave skins from the carcasses of animals.

One of the objections to using an ordinary knife for skinning purposes is that the skin is apt to be injured during the operation of cutting the skin away from the flesh.

The object of my invention is to produce a knife that will cut the skin away from the flesh but will not cut the skin itself; in other words, a safety skinning knife.

A further feature of my invention is to provide a safety knife that may be used either in the right or left hand.

To produce my safety skinning knife, I employ a guard for the blade, the said guard being adapted to be applied, at will, to either side of the blade, whereby the knife can be used in either hand.

I will now proceed to describe my invention in detail, the novel features of which I will finally claim, reference being had to the accompanying drawing, forming part hereof, wherein:

Figure 1 is a side view of my improved knife; Fig. 2 is a similar view, one member of the handle being removed, the securing rivets being sectioned, the plug or block being also shown; Fig. 3 is a top plan view of the knife, the guard being positioned so as to adapt the knife for use by the right hand; Fig. 4 is an enlarged end view of the blade showing the stops for the guard; Fig. 5 is a top plan view of the knife, the guard being positioned so as to adapt the knife for use by the left hand; and Fig. 6 is a vertical sectional view, taken on a line *a—a* in Fig. 2.

As herein embodied, my improvement consists of a knife, a portion of which comprises a handle made up, in this instance, of the members 1 and 2, secured together and to the shank of a cutting blade 3, by rivets 4. One end of the member 2 of the handle is recessed in order that a spring 5 can be inserted, the said spring being secured to the rear end of the blade 3. A block 6 is inserted in the recess 7 to form a plug. The free end of the spring 5 engages the heel portion of a rigid guard 8, which, at 9, is pivotally secured to the handle members. As can be seen in Figs. 1, 2 and 4, the guard 8 is not as wide as the blade 3 whereby the said blade projects slightly beyond the said guard, along the cutting edge thereof. By such a provision the knife can perform its function without hindrance upon the part of the guard, which only acts to keep the blade out of contact with the skin. In order to render the knife adaptable for use in either hand, I form the guard so that it will yield at a certain portion, intermediate the ends thereof, in order that it can be sprung over the blade when it is moved upon its pivot 9 and carried clear of the blade 3.

As can be seen in Fig. 2, the guard 8 is reduced in width at 10 to an extent that will permit it to yield or bend, it being preferably spring tempered at this point or else made of a metal having a certain amount of spring, such as rolled steel.

To permit the guard 8 to be moved to a position along the side of the blade, after said guard has been sprung, at the point 10, I recess the blade 3 as at 11. When the guard 8 has been sprung and when it has been forced to assume a position along the side of the blade, the reduced portion 10 will lie in the recess 11 (see Fig. 5). The spring 5 acts to keep the guard in position along the blade, and to hold it in a raised position as shown by dotted lines in Fig. 2. In order to cause the guard to lie in the proper position relative to the cutting edge of the blade 3, I provide the said guard with stops 12 and 13, the stop 12 being provided with a projection 14, by the aid of which the guard may be pulled away from the blade 3. The stop 12 will contact with the blade 3 when the guard 8 is positioned for right hand use (see Fig. 3) and the stop 13 will contact with the blade when the guard is positioned for left hand use (see Fig. 5).

When in use the blade 3 will lie next to the flesh of the carcass and the guard 8 against the inside of the pelt or skin. As the guard covers all excepting the cutting edge of the blade, it will, as the knife is pressed between the adhering surfaces of the flesh and pelt, keep the pelt away from the blade excepting at the extreme cutting edge. As those who make it a business to skin animals do not always use the care of a more experienced person, they are apt to cut the pelt, for the reason that they often apply the knife in the manner of a slash and they do not always strike the point at which the flesh and pelt adhere, but frequently strike and cut into the flesh (which does no damage) and often into the pelt, which injures the same. By employing my improved knife, it is almost impossible to slash the pelt.

Having now described my invention, what I claim and desire to secure by Letters Patent is:

1. A knife comprising a handle, a cutting blade secured thereto, and a guard, said guard being rigid and of a width slightly less than the width of said blade throughout a portion of its length, said guard being yieldable throughout a portion of the remainder of its length and pivoted to said handle adjacent the rearmost end of said yieldable portion, said handle being provided with a recess adapted to receive the yieldable portion of said blade.

2. A knife comprising a handle, a cutting blade secured thereto, a guard, said guard being rigid and of a width slightly less than the width of said blade throughout a portion of its length, said guard being yieldable throughout a portion of the remainder of its length and pivoted to said handle adjacent the rearward end of said yieldable portion, said handle being provided with a recess adapted to receive the yieldable portion of said blade, and stops carried by said guard adapted to contact with said blade when said guard is in position for use.

Signed at New York city, N. Y. this 23 day of May 1912.

FRIEDRICH W. GROSCHOPP.

Witnesses:
EDWARD A. JARVIS,
ESTELLE O. HAMBURGER.

Copies of this patent may be obtained for five cents each, by addressing the "Commissioner of Patents. Washington, D. C."